March 3, 1942.  W. A. KOSTER  2,274,836
OIL PUMP FOR TRANSMISSIONS
Filed Dec. 22, 1938
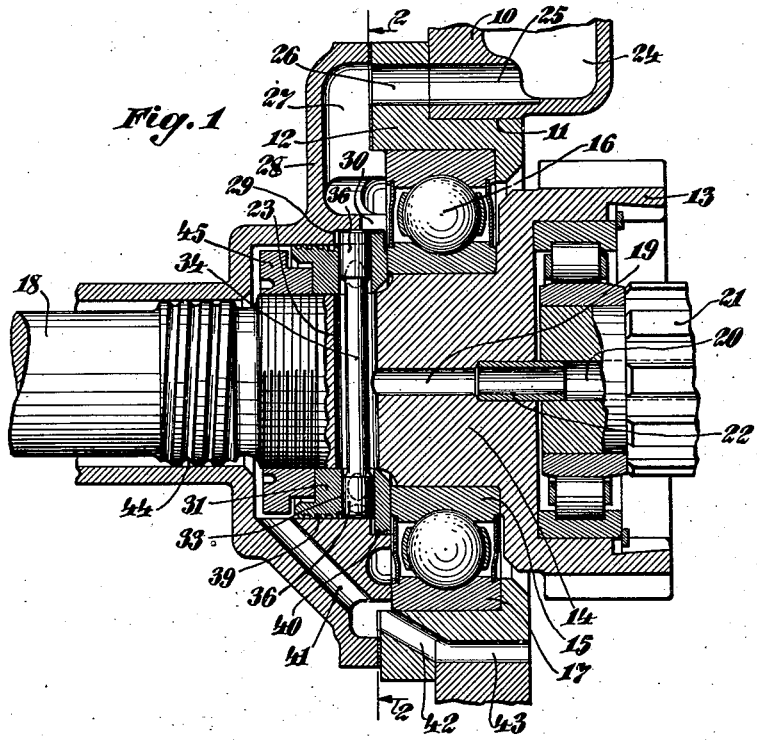
INVENTOR.
William A. Koster,
BY Hoguet, Neary + Campbell,
ATTORNEYS Patented Mar. 3, 1942

2,274,836

UNITED STATES PATENT OFFICE 2,274,836

OIL PUMP FOR TRANSMISSIONS

William A. Koster, Highland Park, N. J., assignor to Mack Manufacturing Corporation, Long Island City, N. Y., a corporation of Delaware Application December 22, 1938, Serial No. 247,142

4 Claims. (Cl. 103—137)

The present invention relates to oil pumps and embodies, more specifically, an improved type of rotary impeller pump by means of which oil may be delivered through the shaft and axially of the pump.

Pumps of this character are of particular importance in connection with transmission mechanisms of the character now in demand because of the importance of adequately lubricating the bearings, which are subjected to constant and severe strains during operation. Because of the fact that transmissions are being increasingly subjected to service of the heavy duty type and requiring large capacities, the adequate lubrication of the transmission mechanism is of increasing importance, and the present invention provides a highly effective pump by means of which a large quantity of lubricant is continually supplied to the bearing bushings and other locations where lubrication is important.

Oil pumps have been provided heretofore of the rotary type and having impeller vanes by means of which the lubricant is pumped from the pump chamber into an axially extending discharge duct that carries the lubricant to the desired locations. The present invention provides an improved mechanism of this type wherein unnecessary heating of the oil is entirely eliminated and wherein the impeller vane which functions as the pumping member also serves as the valve by means of which back-flow is avoided. The invention further provides a pump which is of short and compact design, requiring very little space in the transmission and being of such character that it is readily manufactured and assembled and is effective in operation.

An object of the invention, accordingly, is to provide an improved pump structure adapted particularly for use in connection with transmission mechanisms wherein the operating parts are of such character as to pump the oil efficiently while subjecting it to no unnecessary pressures, thus avoiding unnecessary heating of the oil.

A further object of the invention is to provide a pump of the above character wherein the parts are simple in construction and assembly and function effectively during operation.

Further objects will be apparent from a more detailed description of the invention in connection with the accompanying drawing, wherein:

Figure 1 is a view in broken section, taken on the broken line 1—1 of Figure 2 and looking in the direction of the arrows;

Figure 2 is a view in transverse section, taken on a plane indicated on the line 2—2 of Figure 1 and looking in the direction of the arrows.

The wall of a transmission mechanism is shown at 10, the wall being formed with an aperture, the outline of which is indicated at 11. This aperture is formed to receive a bearing retainer 12 by means of which the main drive pinion 13 of a transmission mechanism may be mounted. The pinion is formed upon an enlarged shaft section 14 upon which is mounted the inner race 15 of bearing 16. The outer race 17 of this bearing is carried by the bearing retainer 12 and thus completes the bearing mounting for the pinion 13. A drive shaft 18 serves as the driving element for the driving pinion 13 and is formed in the enlarged portion 14 thereof, with an axial oil duct 19 by means of which lubricant may be supplied to an oil duct 20 in a spline shaft 21. A nipple 22 is provided to communicate between the ducts 19 and 20 in order that the oil may be directed effectively therebetween, and the duct 19 receives oil from a transverse duct 23 formed in the shaft 18.

In order that an adequate supply of lubricant may be provided for the oiling system of the transmission, oil is collected, for example, by splashing into a trough or duct 24, formed in the transmission wall and directed from this trough through ducts 25 in the transmission wall, 26 in the retainer flange, and 27 formed in a bearing cover 28. This cover is suitably secured to the transmission wall and is formed with a pump chamber 29. The cover or housing 28 provides a communication between the duct 27 and the pump chamber 29 by means of a communicating slot or duct 30.

Serving as a pump rotor is a sleeve 31 which is keyed to the shaft 18 at 32 and thus is driven by the shaft. The shaft 18 and the sleeve 31 are disposed eccentrically with respect to the axis of the pump chamber 29 to provide a crescent shaped space for cooperation with a unitary impeller member 34 to withdraw liquid through the inlet 30. The sleeve is formed with radial bores 33 which communicate with the duct 23 and are adapted to receive impeller vanes carried by the unitary impeller member 34. The unitary impeller member 34 is formed with an intermediate reduced portion as indicated at 35, the extremities of the impeller member being formed as vane members 36 which are slidably received in the bores 33. The length of the impeller member is such that the ends of the vane members slide over the peripheral wall of the pump chamber 29, as will be clearly seen in Figure 2.

As viewed in Figure 2, the direction of rotation, when the device is in operation, is counter-clockwise and, in order that the oil from the pump chamber 29 may be supplied under sufficient pressure to the duct 23, discharge ducts 37 are provided in the sleeve 31 and communicating between the pump chamber 29 and the extremities of the bores 33 adjacent the bore 23. It will be observed that the vane members 36 are formed with inner edges 38 which function as valves to cut off communication between the discharge ducts 37 and the bores 33 at the moment that the respective vane members cease to function to pump oil into the bore 23. In this fashion, all of the oil trapped and pumped by the vane members will be driven through the discharge ducts 37 and supplied to the lubricating system. At no time will oil be trapped in the pump chamber and be unable to escape therefrom through the discharge ducts. This provides an effective mechanism not only for actually pumping the oil, but for valving it through the discharge ducts and to the distributing system.

In order that pressure within the pump chamber may be maintained, spiral oil grooves 39 and 40 are formed in the sleeve. If oil should leak by the spiral groove 39, it will drain back into the transmission casing through a duct 41 formed in the bearing cover 28 and communicating with ducts 42 and 43, in the retainer and transmission wall respectively.

An additional spiral oil groove 44 is formed in the shaft 18 to prevent leakage along the shaft, thus maintaining an effective and oil-tight pump mechanism. It will be observed that the sleeve 31 is retained in position by a nut 45 which is threaded onto a portion of the drive shaft 18. This nut also serves to retain the inner race 15 in the position shown. The timing of the valve action of the lower edge 38 of the vanes 36 is governed by the position of the impeller member in the eccentric pump chamber 29. The foregoing construction provides discharge ducts which permit all of the pumped oil to pass through the pump and into the lubricating system. The oil flow is not shut off until the vane head is at the lowest end of its stroke and the outlet ports formed by the discharge ducts are quite large in area and stay open until all of the pumping has been accomplished. By providing an adequate area of outlet port, foaming of the oil is avoided and the operation of the mechanism is highly efficient.

It will be observed that the simplicity of the structure makes for easy assembly and efficient operation. The impeller member is symmetrical and does not depend for efficient operation upon any particular position within the bore. The mechanism is compact and requires very little space in the transmission, being easily assembled in the bearing cover 28.

While the invention has been described with specific reference to the structure shown in the accompanying drawing, it is not to be limited save as defined in the appended claims.

I claim:

1. A rotary pump comprising a circular housing, a rotary cylindrical body disposed eccentrically with respect to the axis of said housing to provide a substantially crescent-shaped chamber therewith, said housing having an inlet for said chamber, said cylindrical body having a transverse bore therethrough, a cylindrical vane member extending through said bore and adapted to reciprocate therein when said body is rotated, said vane member having a length sufficient to provide a close running fit in said housing and the inner portions of said vane member having a reduced diameter to provide an annular passage in said bore, said cylindrical body having an axial outlet passage communicating with said annular passage and passages adjacent the leading sides of the end portions of the vane member and extending from the periphery of said body into said annular passage, the inner ends of the last named passages being located where the large diameter end portions of the vane member will block said passages when the ends of said vane member are in their inner positions.

2. A rotary pump comprising a circular housing, a rotary cylindrical body disposed eccentrically with respect to the axis of said housing to provide a substantially crescent-shaped chamber therewith, said housing having an inlet for said chamber, said cylindrical body having a transverse bore therethrough, a vane member extending through said bore and adapted to reciprocate therein when said body is rotated, said vane member having a length sufficient to provide a close running fit in said housing, the end portions of said vane member being cylindrical and interconnected by a reduced portion to provide a passage in said bore, said cylindrical body having an outlet passage communicating with the passage portion of the bore and inlet passages adjacent the leading sides of the end portions of the vane member and extending from the periphery of said body into said bore, the inner ends of the last named passages being located where the end portions of the vane member will block said inlet passages when the ends of said vane member are in their inner positions.

3. A rotary pump comprising a circular housing, a rotary cylindrical body disposed eccentrically with respect to the axis of said housing to provide a substantially crescent-shaped chamber therewith, said housing having an inlet for said chamber, said cylindrical body having a transverse bore therethrough, a vane member extending through said bore and adapted to reciprocate therein when said body is rotated, said vane member having a length sufficient to provide a close running fit in said housing, the end portions of said vane member being cylindrical and interconnected by a reduced portion to provide a passage in said bore, said cylindrical body having an outlet passage communicating with the passage portion of the bore and inlet passages at the leading sides of the end portions of the vane member and so disposed as to have communication with the passage portion of the bore when the end portions of the vanes are in fluid impelling positions and to be blocked by said end portions when they are in their inner positions.

4. A rotary pump comprising a shaft having a transverse bore therethrough, a sleeve on said shaft having openings coaxial with said bore, a housing having a circular wall portion disposed eccentrically with respect to the sleeve to provide a substantially crescent-shaped chamber therewith, said housing having an inlet for said chamber, a vane member disposed in said bore and extending through the openings in said sleeve for reciprocation therein when said shaft is rotated, said vane member having a length sufficient to provide a close running fit in said housing, the end portions of said vane member being cylindrical and interconnected with a reduced portion to provide a passage in said bore between said end portions, said shaft having an axial outlet passage communicating with the passage portion of the bore, said sleeve having inlet passages adjacent the leading sides of the openings therein and extending from the periphery thereof into the openings at a depth where the end portions of the vane member will block the passages when the end portions of said vane member are in their inner positions and will permit communication between said passages and the passage portion of the bore when said end portions are in fluid impelling positions.

WILLIAM A. KOSTER.